United States Patent [19]

Kountz et al.

[11] 4,282,719

[45] Aug. 11, 1981

[54] CONTROL SYSTEM FOR REGULATING LARGE CAPACITY ROTATING MACHINERY

[75] Inventors: Kenneth J. Kountz, Hoffman Estates, Ill.; Richard A. Erth; Dean K. Norbeck, both of York, Pa.

[73] Assignee: Borg-Warner Corporation, Chicago, Ill.

[21] Appl. No.: 75,044

[22] Filed: Sep. 12, 1979

[51] Int. Cl.³ ............................................. F25B 1/00
[52] U.S. Cl. ................................... 62/115; 62/209; 62/228
[58] Field of Search ................. 62/228 D, 209, 115

[56] References Cited

U.S. PATENT DOCUMENTS

| | | | |
|---|---|---|---|
| 3,355,906 | 12/1967 | Newton | 62/209 |
| 3,555,844 | 1/1971 | Fleckenstein et al. | 62/228 D |
| 4,151,725 | 5/1979 | Kountz et al. | 62/182 |

Primary Examiner—William E. Wayner
Attorney, Agent, or Firm—James J. Jennings

[57] ABSTRACT

The control system disclosed herein regulates a centrifugal compressor which has inlet guide vanes adjustable to vary the compressor capacity. A variable speed motor is connected to drive the compressor, and variation of this motor speed provides another input for regulating the compressor capacity. A control system achieves optimum energy efficiency, while avoiding surge, by the manner in which the motor speed and the inlet guide vane positions are regulated. To do this, a control signal must be derived to indicate the compressor head value. This signal is achieved by providing two signals, one related to the absolute condenser pressure, and the second related to the absolute evaporator pressure. The control system operates on these two signals to provide a third signal which is a function of a ratio, in which the numerator is the difference between the condenser and evaporator pressures, and the denominator is the evaporator pressure. Alternative measurement and processing techniques are described. This signal affords a very good indication of the compressor head and thus achieves increased efficiency of system operation, with consequent energy conservation, especially at lighter loads and low heads.

4 Claims, 4 Drawing Figures

CONTROL SYSTEM FOR REGULATING LARGE CAPACITY ROTATING MACHINERY

BACKGROUND OF THE INVENTION

Various control schemes have been devised to regulate large capacity compressors, particularly those having adjustable guide vanes. An early showing of such an arrangement, with an associated electronic control system, is described and claimed in U.S. Pat. No. 3,355,906—Newton, entitled "Refrigeration System Including Control For Varying Compressor Speed," which issued Dec. 5, 1967 and is assigned to the assignee of this invention. The method of control there disclosed included providing signals related to the discharge pressure and to the suction pressure of the compressor, and deriving a control signal related to the ratio of these pressures. This signal was then used in regulating the speed of the electrical motor driving the compressor. Later considerable work was directed to the refinement of the control arrangement, particularly the interaction between the compressor's inlet guide vanes and the speed regulation of the electrical motor driving the compressor. A significant step forward in this art using the improved control system is described and claimed in U.S. Pat. No. 4,151,725—Kountz, Erth and Bauman, entitled "Control System for Regulating Large Capacity Rotating Machinery," which issued May 1, 1979 to the assignee of this invention. In the disclosed arrangement the compressor head value was inferred from the difference in two temperatures, one of which is related to the saturated refrigerant vapor leaving the evaporator, and the other the refrigerant in the condenser discharge line. Even with this significant step forward, operation of the system there described did not produce as great a saving at light loads and at low heads as was desired. Considerable analysis was directed to the problem, and it appears at this time that the assumed linearity of the function between the isentropic compressor head parameter, shown as $\Omega$, and the difference between the condensing and evaporating refrigerant temperatures was not applicable over system operation at light loads and at low heads. In addition there are thermal lags involved in measuring the compressor head through inference, by utilizing refrigerant temperatures and taking the difference as described, as contrasted the determination of the head value from refrigerant pressures.

It is therefore a primary object of the present invention to provide an improved control system for such large capacity, rotating machinery which is more effective than the known systems, including those in the referenced patents, and especially shows improvement in system operation at light loads and at low heads.

It is a more specific object of the present invention to derive a new control signal, from quantities readily measurable in existing systems, which will more precisely identify the compressor head value at light loads and low heads, and thus lead to improved operation and energy conservation under these conditions.

SUMMARY OF THE INVENTION

The control system of this invention is useful with a refrigeration system including a compressor, a condenser and an evaporator, all connected in a closed refrigeration circuit. The compressor includes an adjustable capacity control means, such as adjustable inlet guide vanes, and means for regulating the position of the inlet vanes. An electrical prime mover is connected to drive the compressor, and means is provided for regulating the speed of the prime mover. The control system, in a preferred embodiment, provides a signal which is a function of the expression (Pcd−Pev/Pev). This signal is utilized to regulate the inlet vanes and the electrical prime mover in an energy-conservation manner while avoiding compressor surge.

THE DRAWINGS

In the several figures of the drawings, like reference numerals identify like elements, and in those drawings.

DETAILED DESCRIPTION OF THE INVENTION

Figure 1:
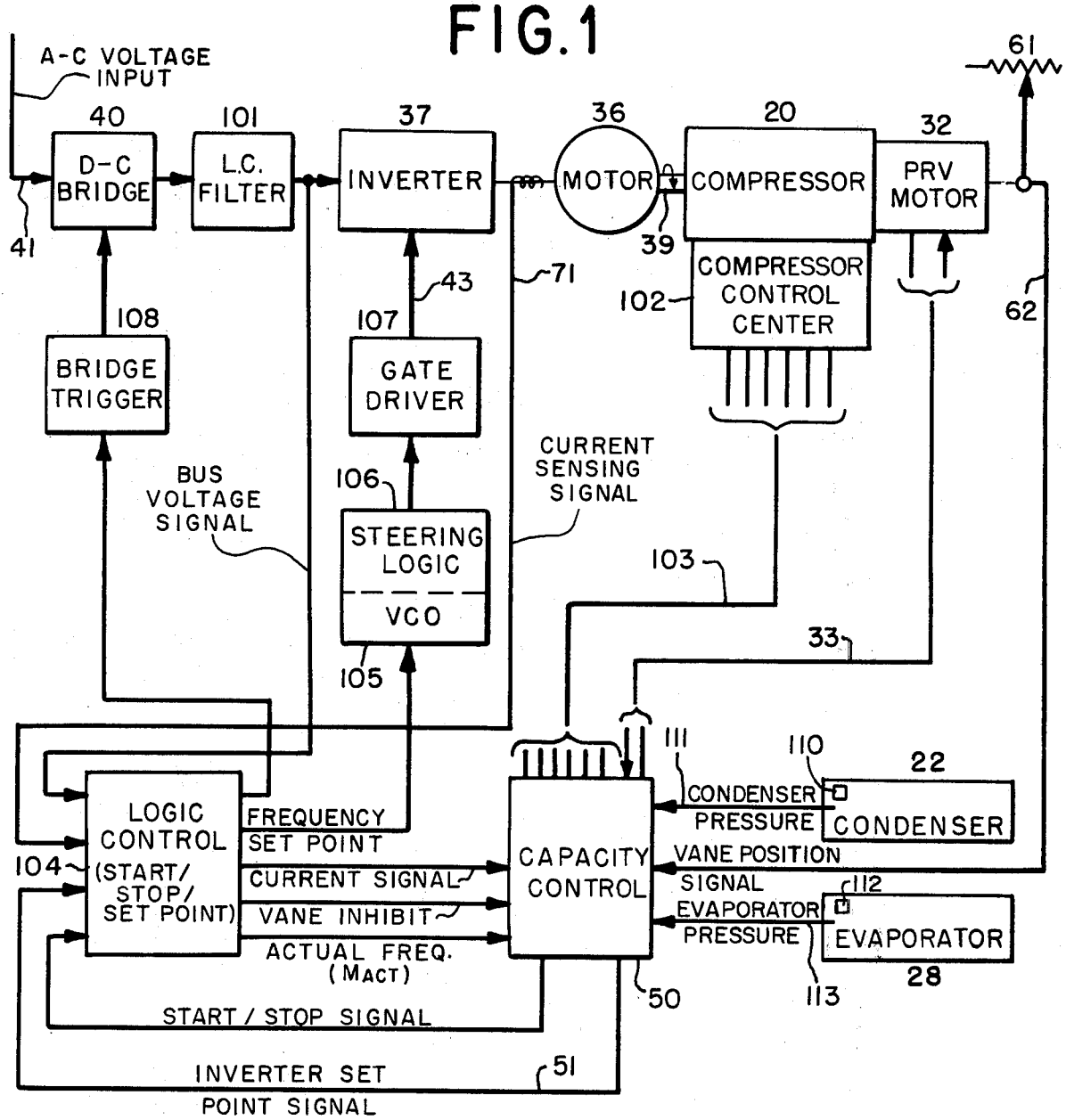
FIG. 1 is a block diagram illustrating the improved control system of this invention in a cooling system which comprises a centrifugal compressor.

FIG. 1 shows a cooling system in which an electrical prime mover 36 is coupled over a shaft 39 to drive a compressor 20. These components, and the other components with reference numerals under 100, are also shown in FIG. 1 of U.S. Pat. No. 4,151,725. The main energy flow is from left to right in the upper portion of FIG. 1, from input line 41, through D-C bridge 40, LC filter 101, and inverter 37 to motor 36, which can be a common induction motor. The cooling circuit details between compressor 20, condenser 22, and evaporator 28 are not shown, because they are well known and understood. Control of the compressor 20 and the adjustable inlet vanes (through PRV motor 32) is regulated from capacity control system 50, described in detail in the '725 patent. The capacity control system 50 is interfaced with a compressor control center 102 located with the compressor, over a plurality of electrical conductors gathered within a cable 103. Capacity control system 50 also receives control signals from logic control system 104. Additionally the logic control system regulates the inverter frequency through a voltage controlled oscillator (VCO) 105, a steering logic stage 106, and gate driver circuit 107. In the earlier '725 patent, the logic stage 44 embraced the functions shown in the separate stages 104–107 in FIG. 1 of the present application. Logic control system 104 also regulates operation of a bridge trigger circuit 108, to correspondingly regulate D-C bridge 40 and control the level of the D-C voltage supplied to inverter 37.

As will become apparent in the subsequent explanation, the substantial improvement in control depends in part upon the use of a first pressure transducer 110 in the condenser, providing a signal on line 111 which is a function of the absolute pressure in the condenser, and a second tranducer 112, providing a signal on line 113 which is a function of the absolute pressure in the evaporator. These two signals will be utilized in capacity control system 50 to develop a control signal which uniquely defines the compressor head and enhances the operating efficiency of the system, even at lighter loads and at a low head.

Figure 2:
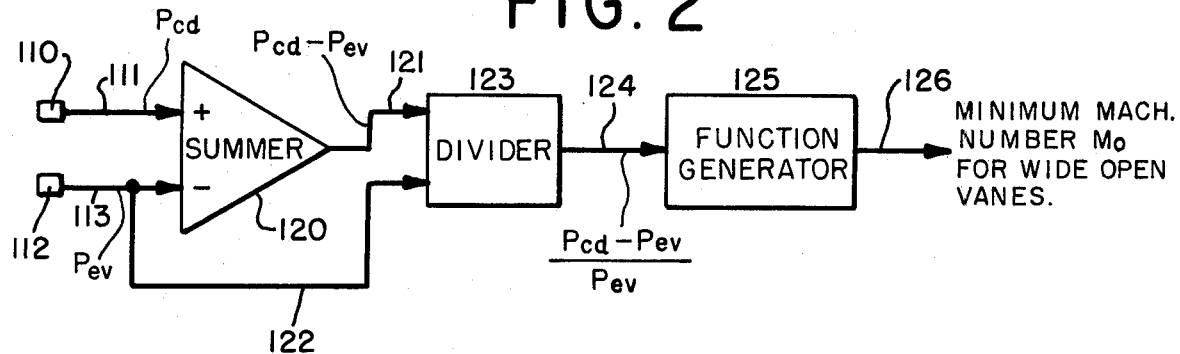
FIG. 2 is a simplified signal diagram depicting portions of the control system of this invention.

The simplified arrangement of FIG. 2 depicts that portion of capacity control system 50 which develops the control signal used in the system of this invention. As there shown, the condenser pressure signal on line 111 and the evaporator pressure signal on line 113 are combined in a summer 120, which algebraically combines these signals to produce on line 121 a signal which represents the difference between the condenser and evaporator pressures. The evaporator pressure signal is also passed over line 122 to a divider stage 123, which effectively operates upon the signals received over lines 121, 122 to produce on its output line 124 a signal which is, in effect, a ratio. The numerator of this signal is the difference between the condenser and evaporator absolute pressures, and the denominator is the evaporator pressure. A function generator 125 then receives the ratio signal and produces on line 126 a signal which represents the minimum mach number $M_o$ for wide open vanes. This is the same signal represented on line 89 in the lower left portion of FIG. 5 of the '725 patent. However, in that patent this $M_o$ signal was derived from the thermistors 56, 58 as a function of the condenser temperature and the evaporator temperature. In the present invention the pressure signals on lines 111, 113 are utilized, and stages 120, 123 can be considered as a means for receiving the condenser and evaporator pressure signals, and for producing an output signal which is a function of the difference between the condenser and evaporator pressures, divided by the evaporator pressure. The utility of this particular function will now be described in connection with FIG. 3.

Figure 3:
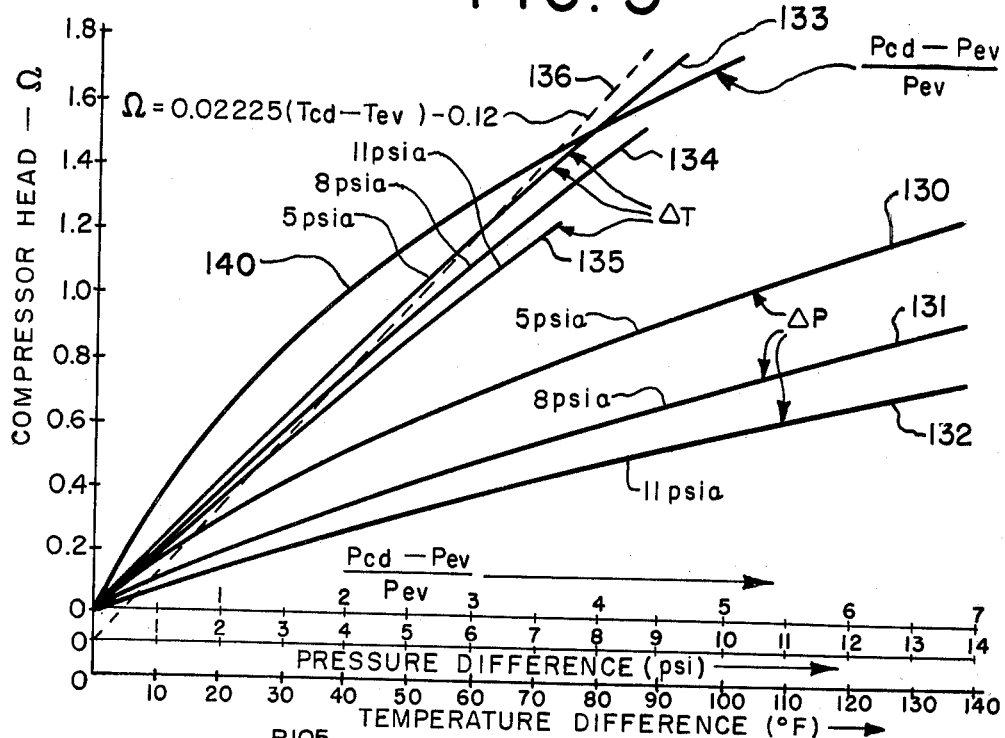
FIG. 3 is a graphical illustration useful in understanding the operation of this invention.

As there shown, various curves have been plotted with different abscissae, but all against the same ordinate, the value of the compressor head. This compressor head, or $\Omega$, is also the ordinate in the showing of FIG. 2 of the '725 patent, and as a different family of curves of FIG. 4 in that patent. In FIG. 3 of this application, the curves 130, 131 and 132 represent the compressor head plotted against a pressure difference (in psi) shown in the center abscissa in the drawing. Curve 130 represents measurements taken at a suction pressure of a 5 psia, curve 131 shows similar information at 8 psia, and curve 132 at a suction pressure of 11 psia. Thus it is manifest there is a wide variance, as a function of the change in suction pressure, of the compressor head value developed by sensing a pressure difference. It is apparent, therefore, that merely using the numerator or pressure difference portion of the expression developed on line 124 in FIG. 2 will not be efficacious in providing a signal value for representing the compressor head under different suction pressure conditions.

The family of curves identified as 133, 134 and 135 in FIG. 3 indicates different head values developed for different suction pressure values, using the temperature difference measuring technique described in the '725 patent. Curve 133 represents the resultant head value at a suction pressure of 5 psia, curve 134 shows the result at a suction pressure of 8 psia and curve 135 indicates the head value developed at a suction pressure of 11 psia. It is apparent that this family of curves 133–135 is a much closer approximation to $\Omega$ than that which is calculated for the pressure-difference approach which produced the curves 130–132. Curve 136 is a functional representation of the head value related to the expression given in the drawing. While this approach, as explained in the '725 patent, produced a substantial increase in efficiency as contrasted to the pressure difference approach, it still under-calculates the head value at light load (less than approximately 0.8) for an evaporator pressure of 7 psia or lower, considering a normal evaporating refrigerant such as R-11.

Thus in accordance with the present invention, the system functions shown in FIG. 2 produced a head value as represented by curve 140 in FIG. 3. It is immediately apparent that there is no variation in the compressor head for different suction pressures. Accordingly, the expression $(P_{cd}-P_{ev}/P_{ev})$ uniquely defines the compressor head value without the range of variation encountered in the temperature difference approach (curves 133–135) or the pressure difference approach (curves 130–132). Thus a capacity control system with the improved arrangement shown generally in FIG. 2 provides much more effective control of the large system represented in FIG. 1 of this application.

The curves shown in FIG. 3 apply to R-11. In addition it is assumed that there is no pressure drop from the evaporator to suction pressure, or from discharge to the condenser. It is further assumed there is no suction superheat. These are reasonable assumptions for a system such as this.

Figure 4:
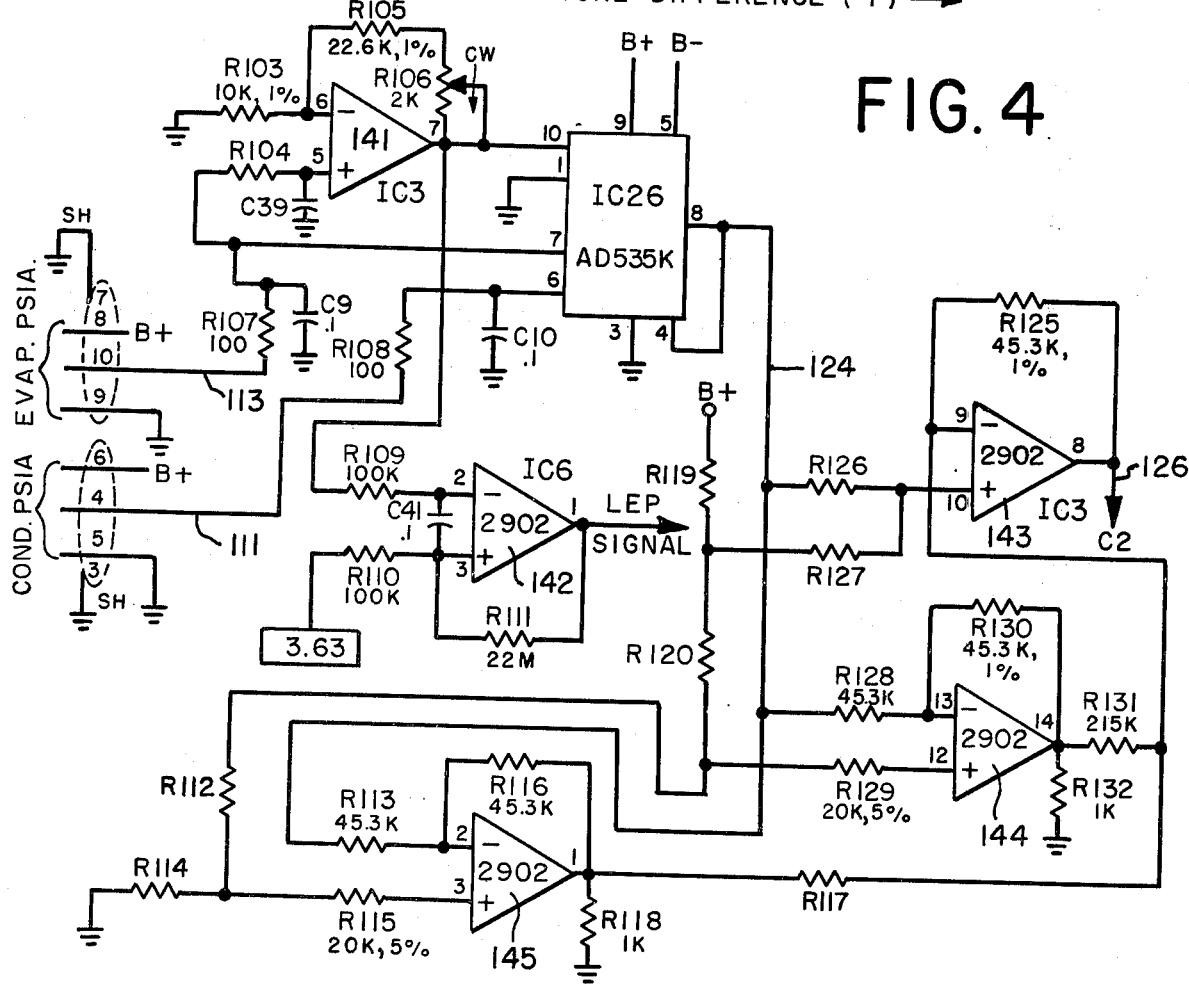
FIG. 4 is a schematic diagram showing a preferred embodiment of the present invention.

FIG. 4 illustrates that portion of the capacity control system 50 which provides the ratio control signal used in the present invention. As there shown the AD535K circuit provides both the difference between the pressure signals and the division by the evaporator pressure signal, so that its output at pin 8 is the desired ratio signal. The amplifier stage referenced 141 is only for purposes of gain. The transfer function of the AD535K provides a difference between the inputs of pins 6 and 7, divided by the difference between the inputs of pins 10 and 1. There are other functions available in this stage, but they are not utilized. The condenser pressure signal is applied over line 111 and resistor R-108 to pin 6, and the evaporator signal is applied over line 113 and resistor R-107 to pin 7. Thus the difference of the pressures is realized for the numerator of the ratio signal. The evaporator pressure signal is also passed through stage 141 to pin 10, and pin 1 is grounded. Hence the output at pin 8 is the desired ratio signal.

The op amp referenced 142 is connected as a Schmitt trigger circuit to provide a low evaporator pressure signal to shut down the system. The ratio control signal is applied over resistors R-126, R-128 and R-113 to the inputs of the op amps 143, 144 and 145. Those skilled in the art will appreciate that these three stages are intercoupled to act as a function generator, and provide on conductor 126 the minimum mach number signal $M_o$ for wide open vanes. This is the basic difference between the present system and that depicted in the '725 patent. Those skilled in the art will readily implement the system of this invention in the light of the detailed showing in the '725 patent.

Considering the general showing in FIG. 5 of the '725 patent, it is apparent that the method of system control represented broadly in the drawing need be varied only in the lower left hand portion to conform with the present invention. That is, the method of system control in accordance with the present invention includes the continual establishment of a compressor head signal, as a function of a signal representing a ratio. As shown in FIG. 2 of this application, the numerator of this ratio is derived from the difference between the condenser absolute pressure $P_{cd}$ and the evaporator absolute pressure $P_{ev}$. The denominator of this ratio signal is derived from the evaporator pressure $P_{ev}$. The resultant signal from the circuit of FIG. 2 is that represented on line 89 in the lower left portion of FIG. 5. Next a functional signal, related to the instantaneous position of the adjustable inlet guide vanes, is derived; this appears at the output side of network 87 in FIG. 5 of the '725 patent. These two signals, the head-indicating signal and the functional signal, are then combined to produce an intermediate signal, represented on line 90. A signal related to the actual motor speed is provided on line 72. This signal, and the intermediate signal on line 90, are combined to produce a first signal (which appears on line 91) for use in regulating the speed of the inverter drive motor, by processing in stage 83 to provide the inverter speed control signal on line 51. A temperature error signal is derived and provided on line 67. This temperature error signal is related to the difference in temperature between the cooling medium (for example, chilled water) at the evaporator outlet and the desired temperature set point, established for example by adjusting the wiper arm of a potentiometer. This temperature error signal or second signal is used to regulate both the speed of the compressor drive motor (by processing in stage 83) and the position of the inlet guide vanes (by processing in PRV control logic stage 96). Because only the lower left portion of FIG. 5 of the '725 patent is changed in implementing the present invention, it is not believed necessary or helpful to reproduce the entire illustration of that figure.

TECHNICAL ADVANTAGES

The present invention provides a much more efficient control arrangement for regulating the operation of large cooling installations, of the type in which an electrical motor drives a compressor to provide one realm of control and the compressor has adjustable guide vanes to provide a second area of control. Both of these areas of control are regulated as a function of the calculated compressor head, as derived from an unobvious ratio signal related to the difference between the condenser and evaporator absolute pressures divided by the evaporator pressure. It has been found that the calculations of the head derived from this expression do not vary with changes in the suction pressure, as do both the pressure difference and the temperature difference functions in FIG. 3. In addition the head calculation is provided much more rapidly than is possible with temperature sensors, because there is no thermal lag. The improved control arrangement has proved substantially more efficient than earlier systems including those of the '725 patent, especially at light loads and low heads.

Those skilled in the art will appreciate that various alternatives are available, both for measuring the system temperature to provide input information, and processing this information to provide the desired ratio signal, $(P_{cd} - P_{ev}/P_{ev})$. For example, a differential pressure transducer could be connected in parallel with the throttling valve of such a system to provide the signal for the numerator of this expression, and an additional absolute pressure transducer can be utilized to provide the signal representing the denominator. Another alternative is the use of two guage pressure transducers, with a barometer (aneroid) pressure transducer to provide the appropriate correction. Other arrangements and processing combinations would doubtless be suggested to those skilled in the art. It is also important to note that the pressure ratio $(P_{cd} - P_{ev}/P_{ev})$ can also be expressed as $(P_{cd}/P_{ev}) - 1$. Thus the compressor and evaporator pressures can be derived, divided to produce the ratio in the first part of this expression, and then a subtraction step employed to produce the required control signal.

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

What is claimed is:

1. A control system for a refrigeration system including a compressor, a condenser and an evaporator, all connected in a closed refrigeration circuit, which compressor includes an adjustable capacity control means, means for regulating the adjustable capacity control means, an electrical prime mover connected to drive the compressor, and means for regulating the speed of the prime mover, which control system includes means for sensing the absolute condenser pressure and the absolute evaporator pressure and for regulating the adjustable capacity control means and the electrical prime mover in an energy-conservation manner while avoiding compressor surge in accordance with a control signal varying as a function of the expression $(P_{cd} - P_{ev}/P_{ev})$, where $P_{cd}$ is the absolute condenser pressure and $P_{ev}$ is the absolute evaporator pressure.

2. A control system for a refrigeration system including a compressor, a condenser and an evaporator, all connected in a closed refrigeration circuit, which compressor includes an adjustable capacity control means, means for regulating the adjustable capacity control means, an electrical prime mover connected to drive the compressor, and means for regulating the speed of the prime mover, which control system comprises:
   circuit means for providing a first signal $P_{cd}$ which is a function of the absolute condenser pressure, for providing a second signal $P_{ev}$ which is a function of the absolute evaporator pressure, and for operating on the first and second signals to provide a third signal which is a function of the ratio between the difference of the first and second signals and the second signal, and
   means for utilizing the third signal to regulate the adjustable capacity control means and the electrical prime mover in an energy-conservation manner while avoiding compressor surge.

3. The method of controlling a refrigeration system having a compressor, a condenser, and an evaporator, all connected in a closed refrigeration circuit, which compressor includes adjustable inlet guide vanes to vary the compressor capacity, and an electrical adjustable speed motor connected to drive the compressor, such that motor speed adjustment also varies the capacity, comprising the steps of:
   deriving a first signal related to the compressor absolute pressure $P_{cd}$;
   deriving a second signal related to the evaporator absolute pressure $P_{ev}$;
   operating upon the first and second signals to provide a control signal which varies as a function of the expression $(P_{cd} - P_{ev}/P_{ev})$; and
   using the control signal to regulate both the speed of the compressor drive motor and the position of the inlet guide vanes.

4. The method of controlling a refrigeration system having a compressor, a condenser, and an evaporator, all connected in a closed refrigeration circuit, which compressor includes adjustable inlet guide vanes to vary the compressor capacity, and an electrical adjustable speed motor connected to drive the compressor, such that motor speed adjustment also varies the capacity, comprising the steps of:

continually establishing a compressor head signal as a function of a signal representing a ratio, in which the numerator is derived from the difference between the condenser and evaporator absolute pressures, and the denominator is derived from the evaporator pressure;

deriving a functional signal related to the instantaneous position of the inlet guide vanes;

combining the head-indicating signal and the functional signal to produce an intermediate signal;

providing a signal related to the actual motor speed;

combining the actual motor speed signal and the intermediate signal to provide a first signal for use in regulating the speed of the compressor drive motor; and deriving a temperature error signal, related to the difference in temperature between the cooling medium at the evaporator outlet and the desired temperature set point, and employing the temperature error signal as a second signal for use in regulating both the speed of the compressor drive motor and the position of the inlet guide vanes.

* * * * *

UNITED STATES PATENT AND TRADEMARK OFFICE
CERTIFICATE OF CORRECTION

PATENT NO. : 4,282,719
DATED : August 11, 1981
INVENTOR(S) : Kenneth J. Kountz et al.

It is certified that error appears in the above—identified patent and that said Letters Patent is hereby corrected as shown below:

Column 6, lines 25 and 61, "(Pcd-Pev/Pev)" each occurrence, should read -- $\dfrac{Pcd - Pev}{Pev}$ --.

Signed and Sealed this

Twenty-seventh Day of October 1981

[SEAL]

Attest:

GERALD J. MOSSINGHOFF

Attesting Officer   Commissioner of Patents and Trademarks